United States Patent [19]
Mead et al.

[11] Patent Number: 5,588,355
[45] Date of Patent: Dec. 31, 1996

[54] KNOCKDOWN COMPACTABLE FOOD SMOKER AND METHOD OF USE THEREOF

[76] Inventors: Julian E. Mead; James B. Mead, both of P.O. Box 871908, Wasilla, Ak. 99687-1908

[21] Appl. No.: 423,279

[22] Filed: Apr. 17, 1995

[51] Int. Cl.$^6$ .............................. A23B 4/044; F24C 5/20
[52] U.S. Cl. .................. 99/449; 99/482; 126/38; 312/264
[58] Field of Search .............................. 99/448, 449, 482, 99/467, 476, 481; 126/37 R, 38; 312/263, 264, 265.1, 265.3, 265.4, 265.5, 265.2, 327, 328

[56] References Cited

U.S. PATENT DOCUMENTS

| | | | |
|---|---|---|---|
| 3,272,346 | 9/1966 | Michaud | 99/449 |
| 3,856,374 | 12/1974 | Christen | 312/264 |
| 3,955,864 | 5/1976 | MacDonald et al. | 312/264 |
| 4,508,096 | 4/1985 | Slattery | 126/38 |
| 4,979,436 | 12/1990 | McGowan | 99/482 |
| 5,355,782 | 10/1994 | Blanchard | 99/482 |

*Primary Examiner*—David Scherbel
*Assistant Examiner*—Reginald L. Alexander
*Attorney, Agent, or Firm*—Michael J. Tavella

[57] ABSTRACT

A free standing assembled smokehouse, which can be collapsed from its open or assembled configuration to a closed or disassembled compact configuration is shown. The open or assembled smokehouse is a box-shaped with a firebox chamber in the lower portion that can accommodate a variety of heat sources such as wood, electric heaters or charcoal. The upper portion of the smokehouse is the comestible chamber where food products are supported by removable shelves that are arranged so that smoke and heat can circulate efficiently, thus smoking the food products uniformly. When disassembled and closed, the smokehouse has a compact configuration that contains all the parts in a narrow rectangular box that is easy to store and transport.

8 Claims, 8 Drawing Sheets

KNOCKDOWN COMPACTABLE FOOD SMOKER AND METHOD OF USE THEREOF

This invention relates to smokehouses and in particular to knockdown, compactable and portable smokehouses.

BACKGROUND OF THE INVENTION

There are several varieties and sizes of smokehouses. Those that have a large smoking capacity do not breakdown and become compact for economical and convenient storage and transport. Smokehouses that can breakdown and fold for storage typically have a small capacity. An example of such a smokehouse is U.S. Pat. No. 3,856,374 to Christen. This smokehouse is easily assembled and readily disassembled for storing and transport; but the design has a relatively small comestible chamber, where the food is smoked. This limits the quantity of food that can be smoked. Thus, to smoke large amounts of meat or fish in the Christen device, the process must be repeated many times. This repetition is time consuming and, as a result, inconsistencies among the various batches of smoked food can occur. Another problem with the Christen device is that it is limited to an electric heating unit for a heat source.

Large smokehouses, where sizable amounts of food can be smoked at one time, are often built in or are built on a permanent location. Thus, they cannot readily be transported or stored on another location. One moveable larger size smokehouse is found in U.S. Pat. No. 3,971,308 to Parker. This smokehouse has a large comestible chamber and is portable. However, it cannot be compacted into a smaller size for storage. Thus, the user must have enough storage space to hold the assembled smokehouse. Moreover, because this unit cannot be compacted, it is more awkward to transport.

Many other smokehouses with large smoking capacity are commercial in nature. These smokehouses have complicated designs and are expensive to build.

SUMMARY OF THE INVENTION

The present invention is a large sized smokehouse for home use that is simple and inexpensive to build. The instant invention can be disassembled for storage so that when fully open and assembled, the unit is a large smokehouse capable of smoking substantial amounts of meat or fish at one time. When the unit is fully compacted for storage, it holds all loose the parts associated with it in the compacted box.

The smokehouse has a box-like structure. Because the smokehouse is designed to compact into a small unit for storage, the walls are built to disassemble. There are two main frames: a back frame and a front frame. The back frame is rectangular and has a solid wall placed within the frame. The front frame is also rectangular. It has a cross brace that supports two doors. When the doors are closed and latched, they act as a front wall, within the frame. Two side walls are used to connect the front and back walls together, forming the box-like housing. A top is provided and it is fitted into the wall structure during assembly. As mentioned above, the front wall has two doors: an upper door that provides access to the comestible chamber and a lower door that provides access to the firebox chamber. A number of shelves can be placed in the comestible chamber. The shelves hold food to be smoked. A number of vent holes are provided to allow a variety of airflows and smoking techniques, making the unit versatile.

The unit is designed to fold for storage. To fold the unit, the sidewalls are removed and placed within the frames. The shelves and other loose parts are placed between the front and rear frame too. The two frames are then latched together in a compact unit.

It is an object of this invention to produce a smokehouse that can be knocked down and compressed for storage, having the capacity to smoke a large amount of food.

It is another object of this invention to create a knockdown smokehouse wherein all the associated parts and equipment are stored within the compacted smokehouse.

It is yet another object of this invention to create a smokehouse that can be reduced to 75 percent of its fully open size when compacted for storage.

It is yet another object of the invention to create a smokehouse that uses a variety of heat sources to generate either hot or cold smoke.

It is a further object of this invention to that can be assembled or dissembled quickly using a minimum of ordinary hand tools.

It is yet another object of this invention to create a smokehouse of simple, inexpensive construction.

DETAILED DESCRIPTION OF THE INVENTION

Figure 1:
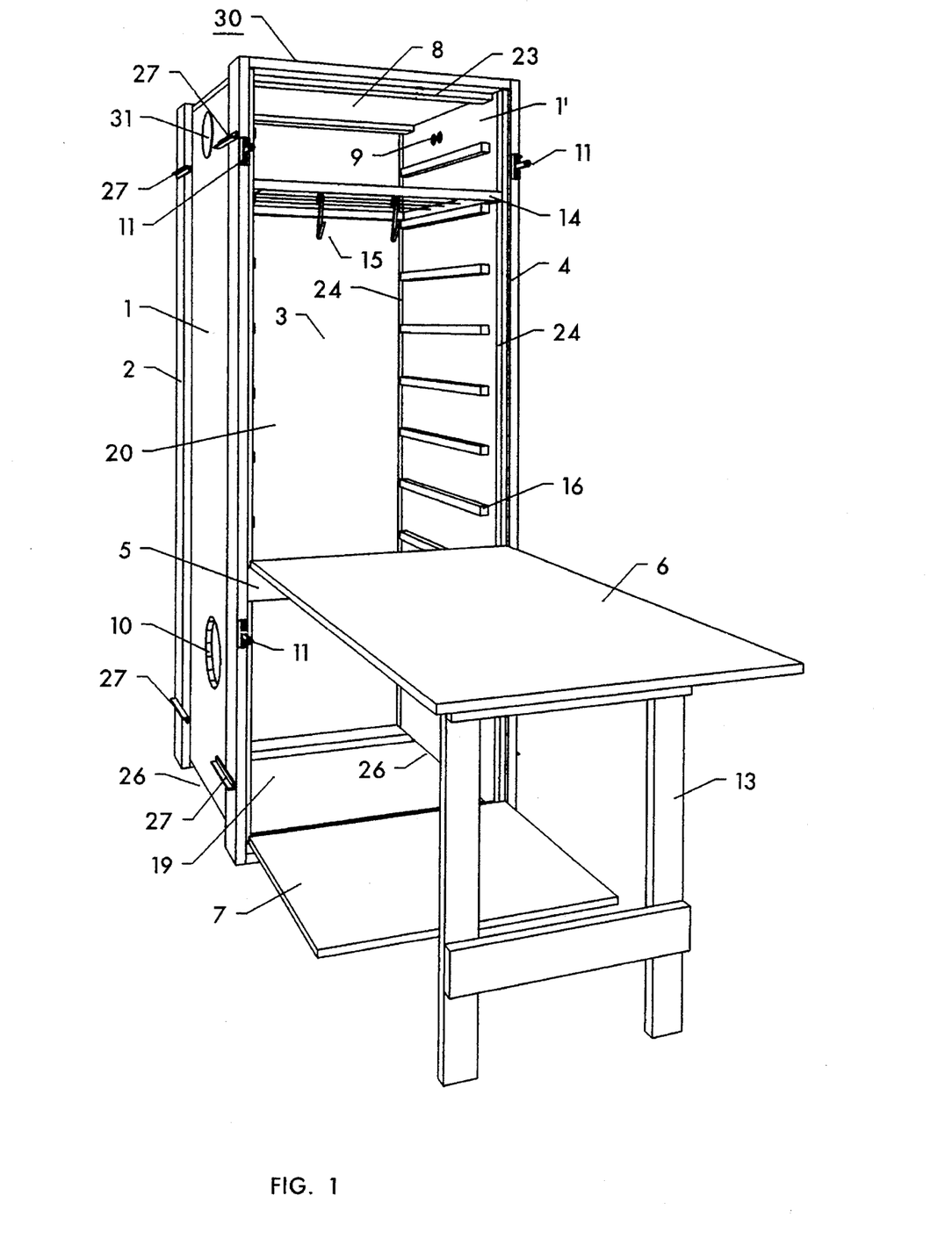
FIG. 1 is a perspective view of the smokehouse in its assembled configuration showing the access doors open.

Referring now to FIG. 1, the smokehouse has a generally box-shaped housing 30. The housing 30 has side walls 1 and 1', a rear wall 3 enclosed in a frame 2, a front brace 5, a front frame 4, and a top 8. In the preferred embodiment, the housing 30 has no bottom, i.e., the bottom is open. Two access doors, 6 and 7, are attached to the front frame 4. The lower door 7, is the access door to the firebox chamber 19. The upper door 6 is the access door to the comestible chamber 20.

Figure 2:
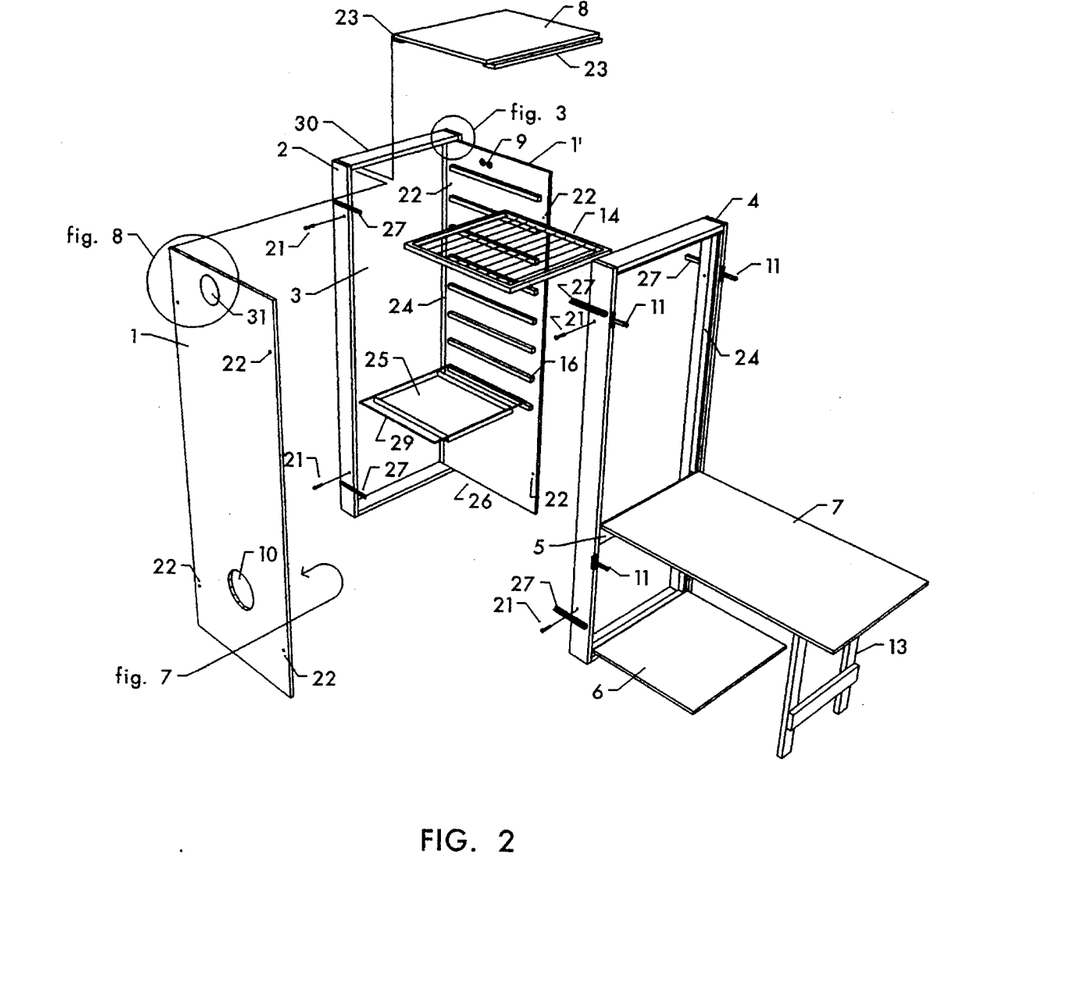
FIG. 2 is an exploded, perspective view of the invention, with certain parts removed for clarity.
Figure 3:
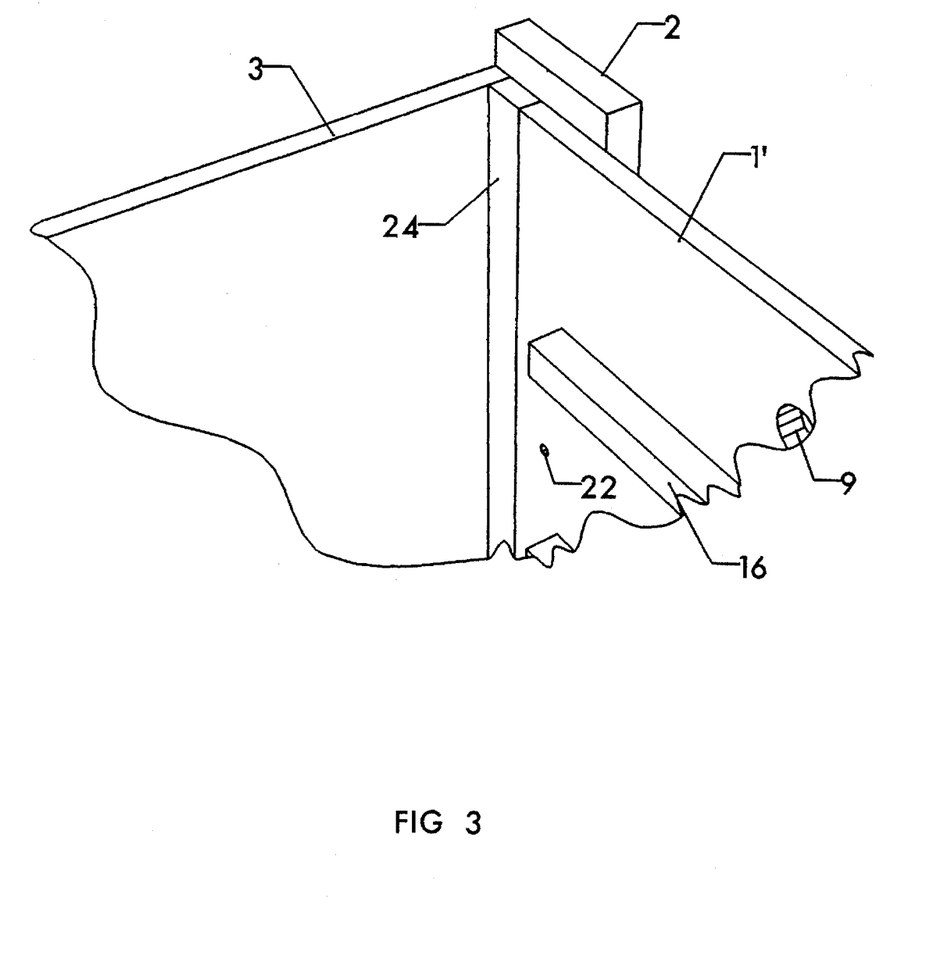
FIG. 3 is a fractional perspective view of the top, rear, inside corner of the present device with certain parts removed for clarity.

Referring now to FIGS. 2 and 3, the rear frame 2 and the front frame 4 are provided. The rear wall 3 is placed with the rear frame 2. The front frame 4 has a brace 5 that acts as a support for the front frame 4 as well as the access doors 6 and 7. Access doors 6 and 7 are attached to the brace 5 with hinges 36. With the access doors 6 and 7 attached to the front frame 4, and the rear wall 3 attached to the rear frame 2, two independent box-like structures are formed. Each has three closed sides and has one open side. See FIG. 2. These box-like structures are assembled using fasteners and fastening means that are appropriate for the materials used. For example, metal construction could use welds at the joints or could be fastened with bolts and nuts. Wood construction could use glue, screws, nails or other similar fasteners. The side walls 1 and 1' are then attached between the front frame 4 and the rear frame 2 as shown and the top 8 is attached, as discussed below, to form the smokehouse.

Figure 8:
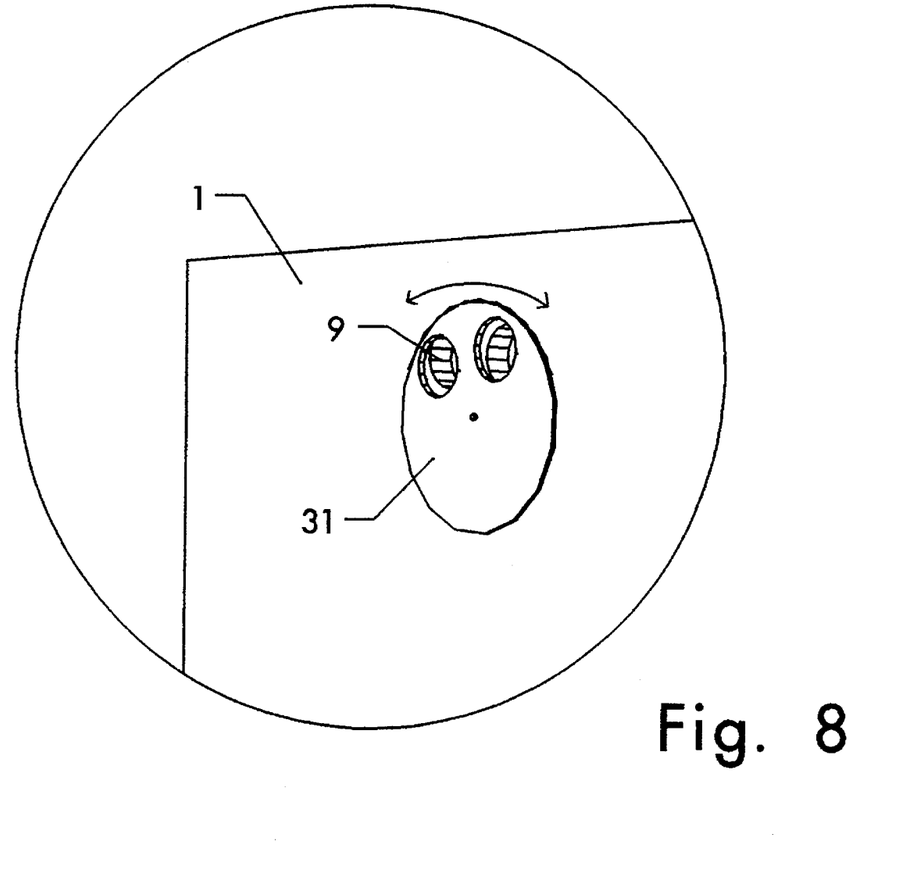
FIG. 8 is a detail of exhaust vents and an adjustable exhaust vent cover.

At the top of the sidewalls 1 and 1', are adjustable smoke vents 9 and 9'. These vents ventilate the combustion chamber 20. Referring now to FIG. 8, vent holes 9 are shown. The vent holes 9 are adjusted by a rotating cover 31. The rotating cover 31 can be rotated as desired so that both vent holes 9 can be fully covered, one vent hole 9 can be covered, or one vent hole 9 and a portion of the other vent hole 9 can be covered.

Figure 7:
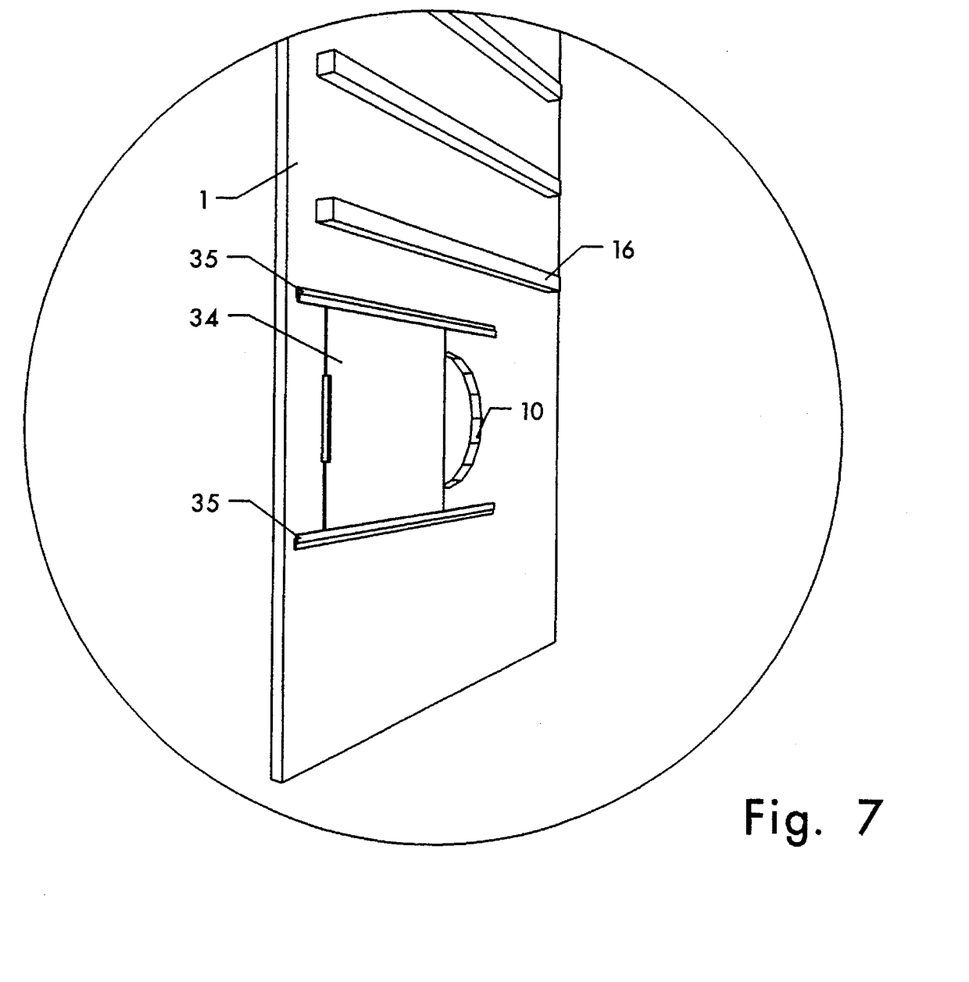
FIG. 7 is a detail of the intake vent and an adjustable intake vent cover.

Referring to FIGS. 1 and 2, a sealable port 10 is installed in one of the side walls 1 or 1'. This port is used to connect an external pipe 32 that supplies smoke from an external firebox 33. The use of an external pipe 32 to feed smoke through port 10 is a technique known as "cold smoking". The port 10 is also used as an adjustable fresh air intake for the firebox chamber 19. FIG. 7 shows details of one method of adjusting airflow though the sealable port 10. In this embodiment, a sliding door 34, that is installed on tracks 35 is used to control the airflow through the port 10. The sliding door 34 is sized to completely cover the port 10 if desired. By sliding the door 34 to an open position, and degree of ventilation can be achieved.

The ability to control these vents improves the circulation of smoke within the unit, thereby preventing the smoke particles from becoming contaminated by excessively flowing around the comestibles.

Figure 5:
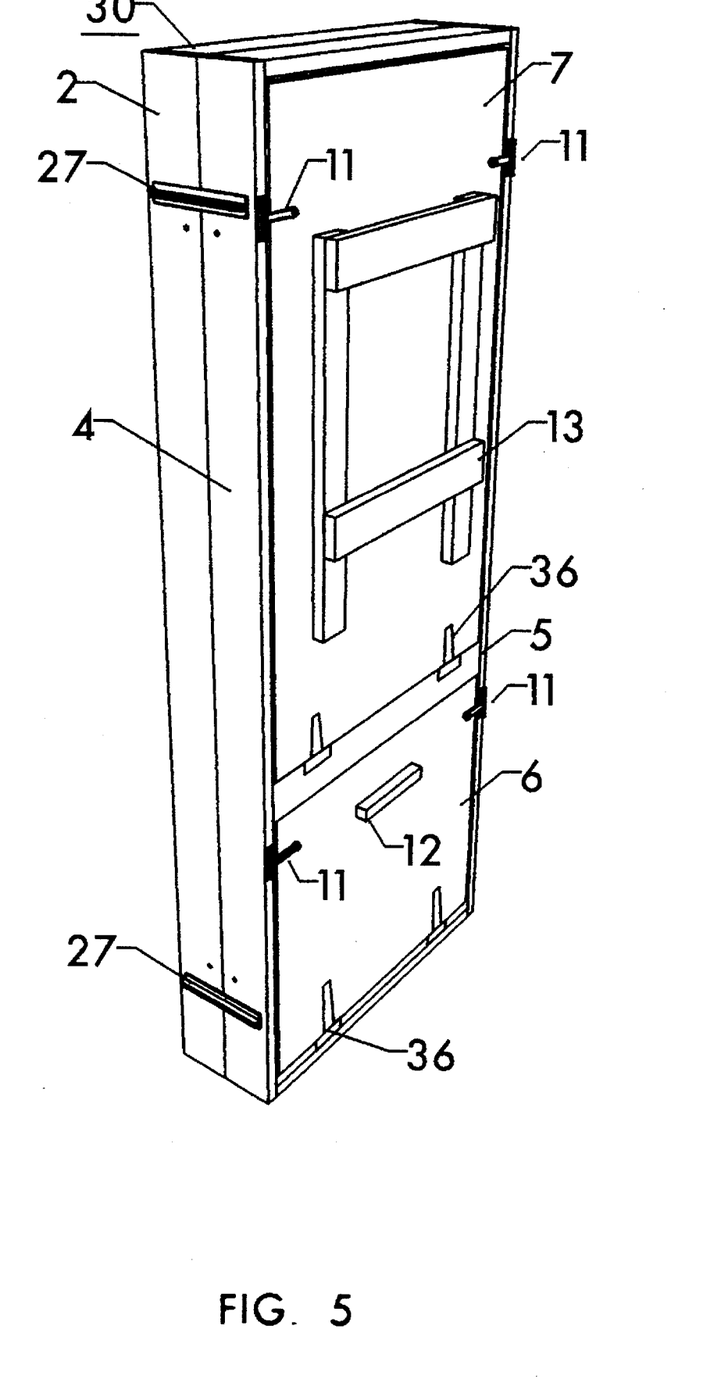
FIG. 5 is a perspective view of the smokehouse in its fully compacted configuration.

Referring now to FIG. 5, suitable latches 11 are provided on the doors 6 and 7 to allow them to be closed securely. A handle 12 is provided on the firebox access door 7 to conveniently operate the door 7.

Figure 4:
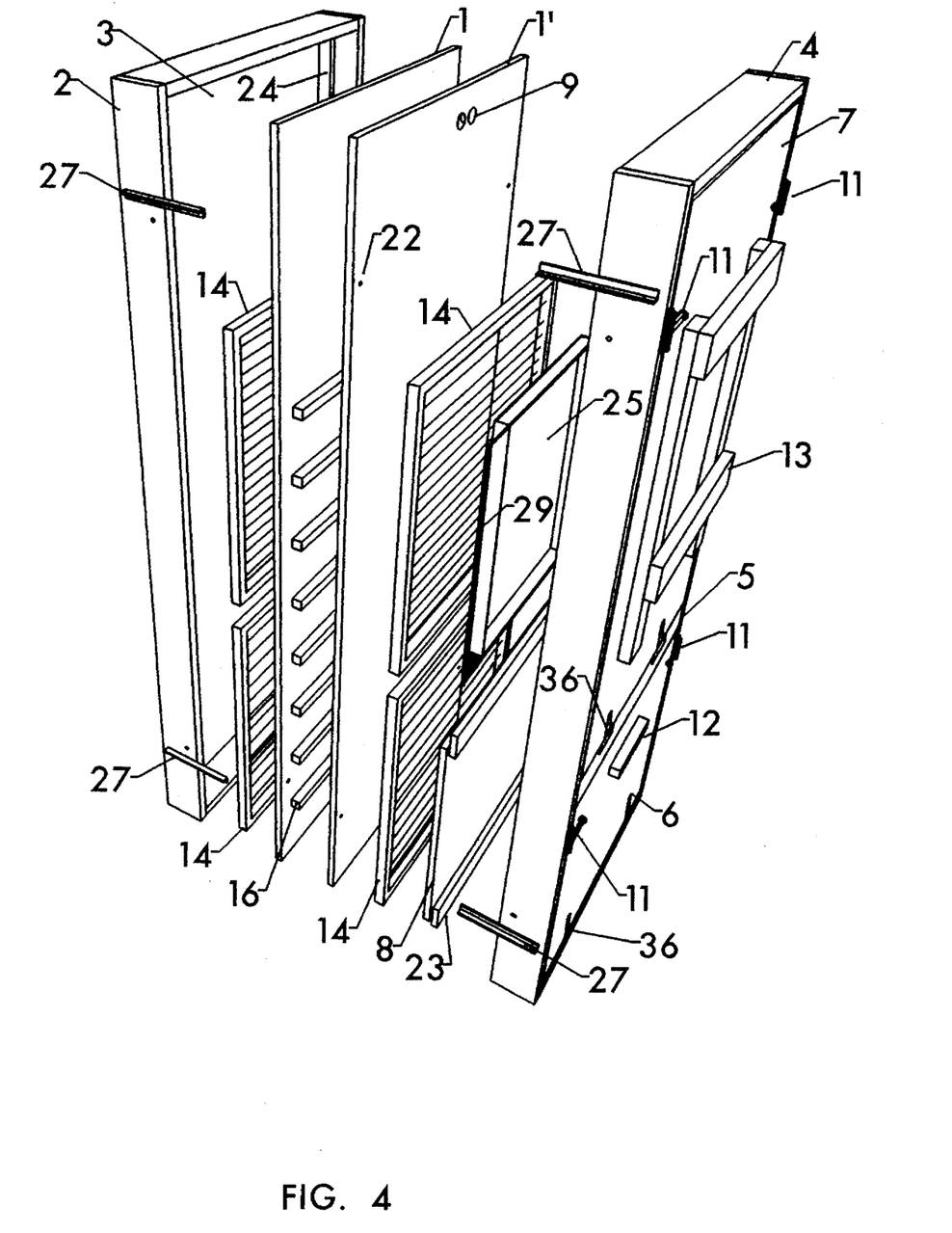
FIG. 4 is an exploded perspective view of the smokehouse in its compacted configuration.

Referring to FIGS. 1, 2 and 4, a hinged leg assembly 13 is mounted on the comestible chamber access door 6, such that when the door 6 is opened, the leg assembly 13 swings down by force of gravity to hold the door 6 in a level or near level position so that it may be used as a temporary work surface. The leg assembly 13 also keeps the door 6 from obstructing the operation of the firebox access door 7.

Figure 6:
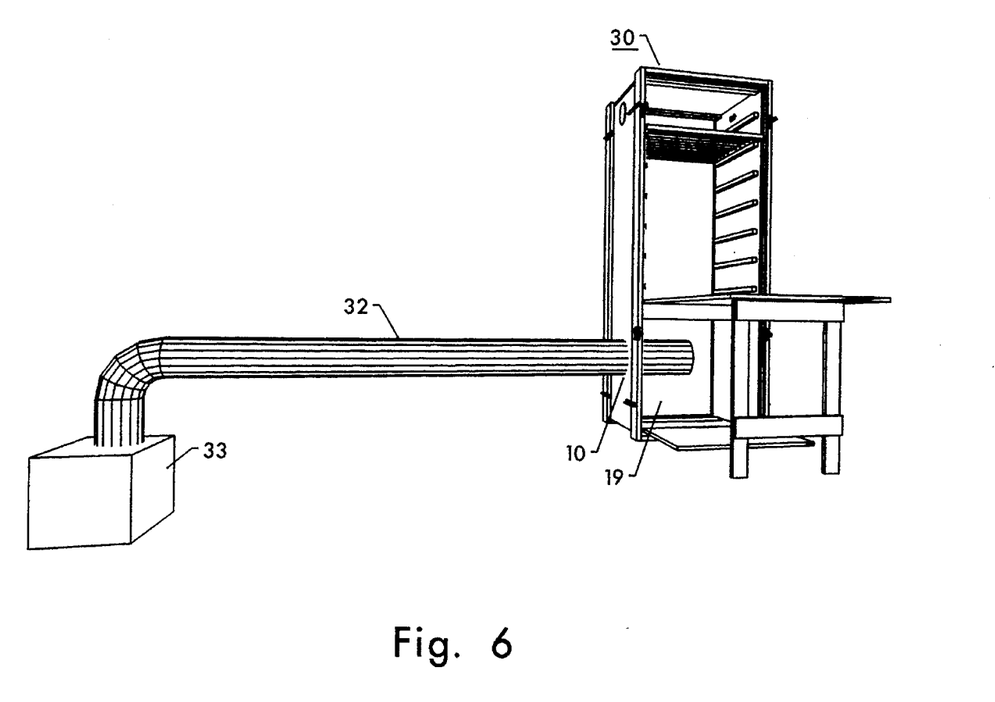
FIG. 6 is a perspective view of the smokehouse, an external firebox and smoke conduit.

Referring now to FIGS. 1 and 6, a number of shelves 14 are installed within the comestible chamber 20 as shown FIG. 1 shows one shelf in place. These shelves 14 can be wire racks or similar shelving. The shelves 14 are installed through the comestible chamber door 6, and rest on support brackets 16. The brackets 16 are mounted on the side walls 1 and 1' as shown. The shelves 14 are designed to accommodate a number of hooks 15 as shown in FIG. 1. For example, the hooks 15 could easily be suspended from wire racks used as shelves 14.

As shown in FIGS. 1 and 2, the preferred embodiment is divided into two chambers: the firebox chamber 19 and the comestible chamber 20. A removable drip pan 25 is provided to separate the firebox chamber 19 from the comestible chamber 20. The drip pan 25 is placed on the lowest level of support brackets 16 as shown. The drip pan 25 blocks direct heat from the fire source in the firebox chamber 19 from the comestible chamber 20. The drip pan 25 is also designed to allow smoke to flow around its perimeter, which is formed with a wire frame 29 as shown, thus creating an even amount of smoke for all the comestibles throughout the comestible chamber 20. The wire frame 29 is also used to support the drip pan 25 on the lowest support bracket 16.

During operation of the smokehouse, a variety of heat sources may be used. For example, a small cooking grill, an electric burner with a pan of wood chips, or even a fire built beneath the smokehouse can be used. Referring to FIG. 1, the heat source 50 is placed within the firebox chamber 19 through access door 7. Smoke is circulated evenly through the wire frame 29 in the drip pan 25. The adjustable shelves 14 and the available styles of shelves that can be used allow for a wide variety of smoking techniques. Moreover, the adjustable vents 9 and 9' in walls 1 and 1' and the drip pan 25 allow for excellent control of smoking and cooking conditions.

Referring now to FIGS. 2, 3, and 4, the smokehouse is assembled as follows: the back wall 3 is attached to the rear frame 2. A pair of side wall guides 24 are attached to the rear frame 2 as shown. The cross brace 5 is installed in the front frame 4 as shown. The side walls 1 and 1' are then placed inside the rear frame 2. The side walls 1 and 1' abut against the side wall guides 24 (see FIG. 3). The side walls 1 and 1' are secured to the frame 2 using bolts 21 that are set into threaded inserts 22 placed into side walls 1 and 1' as shown. Note that the bolts 21 also pass through the frame 2 as shown in FIG. 2. The top 8 has a pair of cleats 23 attached to the bottom front and rear of the top 8 as shown. The top 8 is designed to fit over the side walls 1 and 1'. The cleats 23 are designed to fit under the frame 2 in the rear and frame 4 in the front. In this way, the top 8 is wedged between the frames 2 and 4 and the side walls 1 and 1'. After the top 8 is positioned, the front frame 4, that has the brace 5 in place, can be installed. Here, the front cleat 23 is slid under the top member of the front frame 4 (see FIG. 1). The frame 4 is attached to the side walls 1 and 1' using bolts 21 and the threaded inserts 22 as before. Doors 6 and 7 are attached to the brace 5 using hinges 36 as shown in FIG. 4. Note that once assembled, the doors 6 and 7 are not removed to store the unit. The doors 6 and 7 are latched for storage, creating a front wall surface for the stored unit. See, e.g., FIGS. 4 and 5. The shelves 14, drip pan 25 and a firebox 50 can then be installed. The smokehouse is then ready for use. When assembled, a small gap 26 may exist between the side walls 1 and 1' and the ground. See FIG. 1.

To close the smokehouse for storage, the various pieces are removed in the opposite order. First, the shelves 14 and the baffle 17 are removed. The heating element 50 is removed. The doors 6 and 7 are latched and secured and the hinged leg unit 13 is secured. The bolts 21 are removed from the front frame 4 and the front frame 4 is removed. The top 8 is then slid out and put aside. The side walls 1 and 1' are then removed from the rear frame 2 by removing the bolts 21 from the rear frame 2.

Referring now to FIGS. 4 and 5, to pack the unit for storage, the shelves 14 are placed inside the open box formed by the rear wall 3 and the rear frame 2. This may require placing the rear frame 2 at an angle or laying it down flat. The shelves are designed to fit between the side wall guides 24 and to lie against the rear wall 3. The side walls 1 and 1' are turned so that the inside wall surfaces (with the support brackets 16) are facing each other. One of the side walls is inverted so that the support brackets 16 interlock. The side walls 1 and 1' are then placed inside the rear frame 2, on top of the shelves 14. The side walls 1 and 1' rest on the side wall guides 24, leaving sufficient space for the shelves 14 that are stored underneath. The front frame 4 fits over the rear frame 2 as shown. This arrangement creates an inner space that is used to store the remaining components. External locking guides 27, mounted on the outside of the front and rear wall frames 4 and 2, secure the units together and assure there is no slippage between the two frame assemblies 4 and 2. With the assembly firmly latched, the comestible chamber door 6 can be opened and the top 8 baffle 17 and any additional shelves 14 can be placed inside the unit. The bolts 21 can be stored in a container, such as a plastic bag, and placed in the compacted unit as well. FIG. 5 shows the unit in its fully compacted state.

The unit can be made of any suitable material, such as wood, or metal, such as sheet iron or aluminum, or any other similar material.

The smokehouse is designed for outdoor use only. It provides a large capacity unit that can be quickly disassembled and stored. Because of the smokehouse's compact size, it can readily be transported to a field location and quickly set up for high volume use.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. A portable, compactable smokehouse comprising:
    a) a front frame unit;
    b) a rear frame unit;
    c) a pair of oppositely disposed side walls, said oppositely disposed sidewalls being removably attached to the front frame unit and the rear frame unit, thereby forming a box-like structure;
    d) a top, removably attached to said box-like structure;
    e) a means for supporting food, removably installed within said box-like structure;
    f) a means for providing smoke into said box-like structure;
    g) a first access door, hingably installed on said box-like structure to permit access to said means for providing smoke into said box-like structure;
    h) a second access door, hingably installed on said box like structure to permit access to aid means for supporting food; and
    i) a means for supporting the second access door such that the second access door assumes a horizontal, flat plane surface when opened.

2. The portable, compactable smokehouse of claim 1 further comprising: means for ventilating said box-like structure.

3. The portable, compactable smokehouse of claim 2 further comprising: means for controlling air flow through said means for ventilating said box-like structure.

4. The portable, compactable smokehouse of claim 1 wherein said means for providing smoke into said box like structure comprise a portable means for generating heat, removably placed within said box-like structure.

5. The portable, compactable smokehouse of claim 1 wherein said means for providing smoke into said box like structure comprises:
    a) an external heat source, for producing smoke; and
    b) a means for conducting the smoke into the box-like structure.

6. The portable, compactable smokehouse of claim 5 wherein the means for conducting smoke into the box-like structure also comprises a means for cooling the smoke.

7. The portable, compactable smokehouse of claim 1 whereby said box-like structure can be disassembled and compacted for storage.

8. The method of compacting a smokehouse having a front frame unit, a rear frame unit, a pair of side walls, a top, a means for supporting food, removably installed within said smokehouse, a means for providing smoke into said smokehouse, a first access door, hingably installed on said smokehouse to permit access to said means for providing smoke into said smokehouse, a second access door, hingably installed on said smokehouse to permit access to said means for supporting food, and a means for ventilating said smokehouse comprising the steps of:
    a) removing the means for supporting food from the smokehouse;
    b) removing the rear frame unit from the smokehouse;
    c) removing the top from the smokehouse;
    d) removing the front frame unit from the smokehouse;
    e) placing the pair of side walls within said rear frame unit;
    f) placing the means for supporting food inside the rear frame unit;
    g) placing the top inside the rear frame unit; and
    h) securing the front frame unit to the rear frame unit.

* * * * *